United States Patent
Honma

(10) Patent No.: US 8,757,920 B2
(45) Date of Patent: Jun. 24, 2014

(54) POSITIONING APPARATUS FOR POSITIONING OBJECT, RETAINER AND FASTENER THEREOF

(75) Inventor: Kazuo Honma, Kumagaya (JP)

(73) Assignee: Kabushiki Kaisha Honma Seisakusho, Saitama (JP)

( * ) Notice: Subject to any disclaimer, the term of this patent is extended or adjusted under 35 U.S.C. 154(b) by 105 days.

(21) Appl. No.: 12/765,030

(22) Filed: Apr. 22, 2010

(65) Prior Publication Data

US 2010/0272506 A1 Oct. 28, 2010

(30) Foreign Application Priority Data

Apr. 28, 2009 (JP) ................. P2009-108634

(51) Int. Cl.
*F16B 2/14* (2006.01)
*F16B 7/04* (2006.01)

(52) U.S. Cl.
USPC .......... 403/374.4; 403/19; 403/361; 403/368; 269/58; 269/60; 248/278.1; 411/339; 279/102

(58) Field of Classification Search
CPC  B23B 2231/48; B23B 31/008; B23B 31/117; B23B 31/1177; B23Q 1/0063; B23Q 3/183; B23Q 16/08; B23Q 1/0081; B23Q 16/00; B23Q 16/006; B23Q 1/0072; F16B 2/06; F16B 4/00; F16B 4/004; F16B 17/00
USPC ........... 403/11, 12, 18, 19, 20, 361, 343, 367, 403/368, 374.2, 374.3, 374.4; 296/58, 60, 296/61; 248/278.1; 269/58, 60, 61, 310, 269/313; 279/43.2, 43.3, 43.4, 43.5, 8, 102; 411/339; 409/232
See application file for complete search history.

(56) References Cited

U.S. PATENT DOCUMENTS

| 4,834,597 | A | * | 5/1989 | Andersson et al. ........... 409/234 |
| 5,026,224 | A | * | 6/1991 | Andersson et al. ........... 409/234 |

(Continued)

FOREIGN PATENT DOCUMENTS

| CN | 1426872 A | 7/2003 |
| CN | 1741872 A | 3/2006 |

(Continued)

OTHER PUBLICATIONS

European Search Report dated Aug. 17, 2010, issued in corresponding European Patent Application No. 10161357.8.

(Continued)

*Primary Examiner* — Daniel P Stodola
*Assistant Examiner* — Matthew R McMahon
(74) *Attorney, Agent, or Firm* — Stein IP, LLC

(57) ABSTRACT

A positioning apparatus for positioning an object in respective axis directions of an X-axis, a Y-axis perpendicular to the X-axis, and a Z-axis orthogonal to the X-axis and the Y-axis and positioning the object around the Z-axis within a plane parallel to the X-axis and the Y-axis is provided. A fastener detachably fastens the retainer. A gap is formed between a first reference surface of the retainer and the second reference surface of the fastener when a fixing shaft of the retainer is inserted into a fixing hole of the fastener, an outer surface of a pyramid part of the fixing shaft fits to an inner surface of the fixing hole and the object is positioned in the X-axis direction and the Y-axis direction. The first reference surface and the second reference surface come into contact with each other when a fastening part of the fastener pulls the fixing shaft, the pyramid part or the fixing hole elastically deforms, and the fixing shaft is further pulled into the fixing hole with maintaining the fitting between the outer surface of the pyramid part and the inner surface of the fixing hole.

2 Claims, 8 Drawing Sheets

(56) References Cited

U.S. PATENT DOCUMENTS

| | | | |
|---|---|---|---|
| 5,370,378 A * | 12/1994 | Weber et al. | 269/309 |
| 5,607,263 A * | 3/1997 | Nespeta et al. | 407/61 |
| 5,785,450 A * | 7/1998 | Ichikawa et al. | 403/368 |
| 5,788,249 A * | 8/1998 | Tagami | 279/51 |
| 5,997,226 A * | 12/1999 | Tagami | 409/231 |
| 6,161,826 A * | 12/2000 | Forrer | 269/309 |
| 6,315,488 B1 * | 11/2001 | Parker | 403/329 |
| 6,702,508 B2 * | 3/2004 | Simons et al. | 403/359.2 |
| 6,779,944 B2 * | 8/2004 | Schnorrer | 403/374.2 |
| 6,799,758 B2 * | 10/2004 | Fries | 269/309 |
| 6,974,287 B2 * | 12/2005 | Neumeier | 409/232 |
| 7,131,802 B2 * | 11/2006 | Pantzar | 409/234 |
| 7,478,983 B2 * | 1/2009 | Guy | 409/232 |
| 7,819,392 B2 * | 10/2010 | Kuroda et al. | 269/309 |
| 8,075,218 B2 * | 12/2011 | Kroener | 403/341 |
| 2002/0071717 A1 | 6/2002 | Nordquist et al. | |
| 2002/0197104 A1 * | 12/2002 | Bauman et al. | 403/274 |
| 2010/0308524 A1 * | 12/2010 | Kitaura et al. | 269/309 |

FOREIGN PATENT DOCUMENTS

| | | |
|---|---|---|
| DE | 20 2004 018 168 | 4/2006 |
| DE | 20 2004 018 168 U1 | 4/2006 |
| EP | 1 013 375 | 6/2000 |
| JP | 2003-200326 | 7/2003 |
| WO | WO 98/28100 | 7/1998 |
| WO | WO 2009/097150 A2 | 8/2009 |
| WO | WO 2009096150 A1 * | 8/2009 |

OTHER PUBLICATIONS

Japanese Office Action dated Oct. 25, 2011, issued in corresponding Japanese Patent Application No. 2009-108634.

Chinese Office Action dated Dec. 16, 2013, issued in corresponding Chinese Patent Application No. 201010160667X.

* cited by examiner

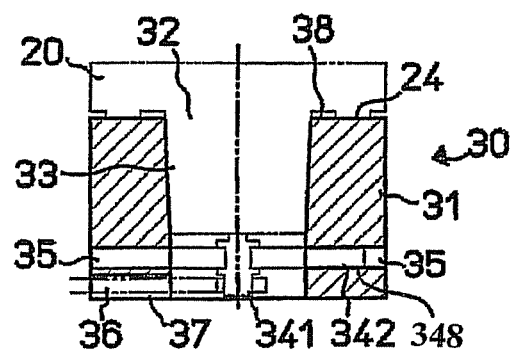
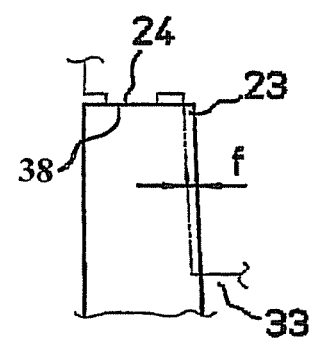
FIG. 5A
FIG. 5B
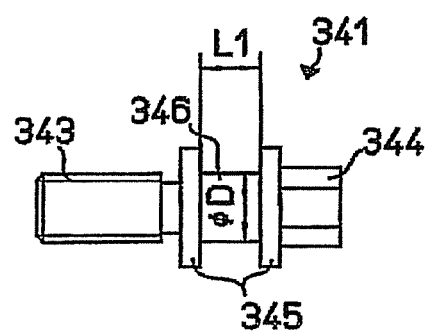
FIG. 6A
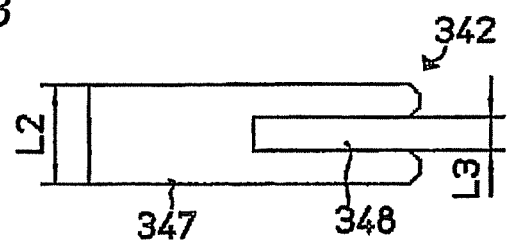
FIG. 6B

POSITIONING APPARATUS FOR POSITIONING OBJECT, RETAINER AND FASTENER THEREOF

The disclosure of Japanese Patent Application No. 2009-108634 filed on Apr. 28, 2009 including specification, drawings and claims is incorporated herein by reference in its entirety.

BACKGROUND

The present invention belongs to a technical field related to a positioning apparatus, a retainer thereof, and a fastener thereof, for positioning an object in respective axis directions of an X-axis, a Y-axis perpendicular to the X-axis, and a Z-axis orthogonal to the X-axis and the Y-axis, and positioning the object around the Z-axis within a plane parallel to the X-axis and the Y-axis.

JP-A-2003-200326 which belongs to the same technical field of the present invention discloses a clamp device. The clamp device of JP-A-2003-200326 includes a clamp chuck, and a workpiece supporting body releasably connected to the clamp chuck, wherein the workpiece supporting body has a flat bottom surface; and a clamp pin which protrudes from the flat bottom surface, wherein the clamp chuck includes a central opening having a conical insertion portion for accommodating the clamp pin of the workpiece supporting body, wherein the clamp pin includes at least one surface portion whose shape corresponds to the shape of the conical insertion portion of the central opening for positioning the clamp pin in the X-direction and the Y-direction, and wherein the clamp chuck includes a clamp unit for securing the clamp pin of the workpiece supporting body into the central opening in a clamped state, and at least one surface portion which serves as a stop member in the Z-direction. The dimensions of the clamp pin are determined such that a gap exists between the flat bottom surface of the workpiece supporting body and the surface portion of the clamp chuck, serving as the stop member in the Z-direction, before the clamp unit is operated after the clamp pin of the workpiece supporting body is inserted into the central opening of the clamp chuck, at least one surface portion of the clamp pin comes in contact to the conical insertion portion of the central opening, and thereby, the clamp pins are arrayed with respect to the clamp chuck in the X-direction and/or the Y-direction. Thereby, the clamp pin, and/or a region around the central opening of the clamp chuck elastically deform when the clamp unit is operated, the clamp pin is further pulled into the central opening, and simultaneously, the workpiece supporting body is pulled toward the surface portion of the clamp chuck, serving as the stop member in the Z-direction. Then, the flat bottom portion of the workpiece supporting body comes to rest on the surface portion of the clamp chuck, serving as the stop member in the Z-direction.

By adopting such a configuration, the clamp device of JP-A-2003-200326 obtains the following three advantageous effects: "obtaining a clamp device which includes a clamp chuck and a workpiece supporting piece releasably connected to the clamp chuck and in which the clamp chuck is particularly suitable for a system, the clamp chuck is formed into pallet, and an individual clamp chuck is significantly robust and strong", "obtaining a clamp device which includes a clamp chuck, and a workpiece supporting body releasably connected to the clamp chuck and in which clamp pins are positioned in an X-direction and/or a Y-direction in a state where there is no gap", and "obtaining a clamp device which includes a clamp chuck and a workpiece supporting piece releasably connected to the clamp chuck and in which the movement of clamp pin, and the workpiece supporting body in the Z-direction are possible, without providing a separate elastic means after clamp pin is positioned in an X-direction and/or a Y-direction".

SUMMARY

It is an object of at least one embodiment of the present invention to provide an improved positioning apparatus, retainer and fastener.

According to a first aspect of at least one embodiment of the present invention, there is provided a retainer of a positioning apparatus for positioning an object in respective axis directions of an X-axis, a Y-axis perpendicular to the X-axis, and a Z-axis orthogonal to the X-axis and the Y-axis and positioning the object around the Z-axis within a plane parallel to the X-axis and the Y-axis, the positioning apparatus including: a fastener which is configured to detachably fasten the retainer and which includes: a body part having one surface and the other surface opposite to the one surface; a fixing hole being formed in the one surface of the body part and having an inner surface; a second reference surface being disposed at a side of the one surface of the body part and being arranged perpendicular to an axis of the fixing hole; and a fastening part, the retainer comprising: a fixing part having one surface and the other surface opposite to the one surface and being configured to fix the object on one surface thereof; a fixing shaft having an axis which extends in a Z-axis direction and positions the object in an X-axis direction and a Y-axis direction and protruding from the other surface of the fixing part; and a first reference surface being disposed at a side of the other surface of the fixing part and being arranged perpendicular to the axis of the fixing shaft so that the first reference surface can come into contact with the second reference surface, wherein the fixing shaft being formed integrally with the fixing part has a tapered pyramid part which decreases in size at a constant angle toward a free end thereof, which corresponds to the fixing hole of the fastener so that a whole outer surface of the pyramid part can come into close contact with the inner surface of the fixing hole, and which is formed coaxially with the fixing shaft, wherein each of intersection angles between adjacent sides of the pyramid part is the same and each of two ends between the adjacent sides is connected by a curve being outwardly convexed from the axis of the fixing shaft in a cross-sectional view perpendicular to the axis of the fixing shaft, and wherein fixing shaft is configured such that a gap is fowled between the first reference surface and the second reference surface when the fixing shaft is inserted into the fixing hole, the outer surface of the pyramid part fits to the inner surface of the fixing hole and the object is positioned in the X-axis direction and the Y-axis direction, and is configured such that the first reference surface and the second reference surface come into contact with each other when the fastening part pulls the fixing shaft toward the other surface of the body part, the pyramid part or the fixing hole elastically deforms, and the fixing shaft is further pulled into the fixing hole with maintaining the fitting between the outer surface of the pyramid part and the inner surface of the fixing hole.

According to a second aspect of at least one embodiment of the present invention, there is provided a fastener of a positioning apparatus for positioning an object in respective axis directions of an X-axis, a Y-axis perpendicular to the X-axis, and a Z-axis orthogonal to the X-axis and the Y-axis and positioning the object around the Z-axis within a plane parallel to the X-axis and the Y-axis, the positioning apparatus including a retainer which includes: a fixing part having one surface and the other surface opposite to the one surface and being configured to fix the object on one surface thereof; a fixing shaft having an axis which extends in a Z-axis direction and positions the object in an X-axis direction and a Y-axis direction and protruding from the other surface of the fixing part; and a first reference surface being disposed at a side of the other surface of the fixing part and being arranged perpendicular to the axis of the fixing shaft, wherein the fixing shaft being formed integrally with the fixing part has a tapered pyramid part which decreases in size at a constant angle toward a free end thereof and which is formed coaxially with the fixing shaft, and wherein each of intersection angles between adjacent sides of the pyramid part is the same and each of two ends between the adjacent sides is connected by a curve being outwardly convexed from the axis of the fixing shaft in a cross-sectional view perpendicular to the axis of the fixing shaft, the fastener comprising: a body part having one surface and the other surface opposite to the one surface; a fixing hole being formed in the one surface of the body part and having an inner surface which corresponds to the pyramid part of the fixing shaft so that a whole outer surface of the pyramid part can come into close contact with the inner surface of fixing hole; a second reference surface being disposed at a side of the one surface of the body part and being arranged perpendicular to an axis of the fixing hole so that the first reference surface can come into contact with the second reference surface; and a fastening part being configured to pull the fixing shaft which is inserted into the fixing hole toward the other surface of the body part, wherein the fixing hole is configured such that a gap is formed between the first reference surface and the second reference surface when the fixing shaft is inserted into the fixing hole, the outer surface of the pyramid part fits to the inner surface of the fixing hole and the object is positioned in the X-axis direction and the Y-axis direction, and is configured such that the first reference surface and the second reference surface come into contact with each other when the fastening part pulls the fixing shaft toward the other surface of the body part, the pyramid part or the fixing hole elastically deforms, and the fixing shaft is further pulled into the fixing hole with maintaining the fitting between the outer surface of the pyramid part and the inner surface of the fixing hole.

According to a third aspect of at least one embodiment of the present invention, there is provided a positioning apparatus for positioning an object in respective axis directions of an X-axis, a Y-axis perpendicular to the X-axis, and a Z-axis orthogonal to the X-axis and the Y-axis and positioning the object around the Z-axis within a plane parallel to the X-axis and the Y-axis, the positioning apparatus comprising: a retainer; and a fastener being configured to detachably fasten the retainer, wherein the retainer includes: a fixing part having one surface and the other surface opposite to the one surface and being configured to fix the object on one surface thereof; a fixing shaft having an axis which extends in a Z-axis direction and positions the object in an X-axis direction and a Y-axis direction and protruding from the other surface of the fixing part; and a first reference surface being disposed at a side of the other surface of the fixing part and being arranged perpendicular to the axis of the fixing shaft, wherein the fixing shaft being formed integrally with the fixing part has a tapered pyramid part which decreases in size at a constant angle toward a free end thereof and which is formed coaxially with the fixing shaft, wherein each of intersection angles between adjacent sides of the pyramid part is the same and each of two ends between the adjacent sides is connected by a curve being outwardly convexed from the axis of the fixing shaft in a cross-sectional view perpendicular to the axis of the fixing shaft, wherein the fastener includes: a body part having one surface and the other surface opposite to the one surface; a fixing hole being formed in the one surface of the body part and having an inner surface which corresponds to the pyramid part of the fixing shaft so that a whole outer surface of the pyramid part can come into close contact with the inner surface of fixing hole; a second reference surface being disposed at a side of the one surface of the body part and being arranged perpendicular to an axis of the fixing hole so that the first reference surface can come into contact with the second reference surface; and a fastening part being configured to pull the fixing shaft which is inserted into the fixing hole toward the other surface of the body part, wherein fixing shaft or the fixing hole is configured such that a gap is formed between the first reference surface and the second reference surface when the fixing shaft is inserted into the fixing hole, the outer surface of the pyramid part fits to the inner surface of the fixing hole and the object is positioned in the X-axis direction and the Y-axis direction, and is configured such that the first reference surface and the second reference surface come into contact with each other when the fastening part pulls the fixing shaft toward the other surface of the body part, the pyramid part or the fixing hole elastically deforms, and the fixing shaft is further pulled into the fixing hole with maintaining the fitting between the outer surface of the pyramid part and the inner surface of the fixing hole.

The advantageous effects of the retainer, the fastener, and the positioning apparatus according to the first to third aspects will be described taking the positioning apparatus according to the third aspect as an example.

The retainer fixes and retains the object on one surface of the fixing part. The object may be fixed to the fixing part by, for example, screwing with bolts and other well-known fixing methods. It is preferable to provide a reference surface for alignment in the fixing part so that the object can be fixed in a desired posture in the X-axis direction and the Y-axis direction. The fastener which detachably fastens the retainer is positioned and fixed by, for example, a well-known fixing means within a machining/testing region, such as a table of a machine tool or a testing device, and the retainer is attached, and fastened in that position.

The fixing shaft formed integrally with the fixing part of the retainer is inserted into the fixing hole of the fastener through an opening on one surface. Here, since the inner surface of the fixing hole corresponds to the pyramid part of the retainer, and is formed such that the outer surface of the pyramid part can be brought into close contact with the inner surface, the pyramid part fits to the inner surface of the fixing hole. At this time, the object which is fixed to the fixing part of the retainer is brought into a positioned state of being positioned in the X-axis direction and the Y-axis direction. On the other hand, since a constant gap is formed between the first reference surface and the second reference surface, and the first and second surfaces do not come into contact with each other, the object is not positioned in the Z-axis direction. Thereafter, the fastening part pulls the fixing shaft toward the other surface, i.e., toward the free end of the fixing shaft, and the pyramid part or fixing hole which are in close contact with each other elastically deform due to this pulling force. As a result, the fixing shaft is further pulled into the fixing hole with the fitting of the inner surface and the outer surface is maintained, and the first reference surface and the second reference surface come into contact with each other. In this fastening process, the object is also positioned in the Z-axis direction while the positioned state in the X-axis direction and the Y-axis direction is maintained, and the object is positioned with extremely high precision in the respective axis directions of the X-axis, the Y-axis, and the Z-axis.

Here, the pyramid part of the fixing shaft is configured so that each intersection angle between adjacent sides of the pyramid part is the same in the cross-sectional view perpendicular to the axis of the fixing shaft, and the inner surface of the fixing hole is formed so as to correspond to the pyramid part. Accordingly, after the pyramid part is aligned around an axis, i.e., the Z-axis, and the fixing shaft is inserted into the fixing hole, the object is also positioned around the Z-axis with high precision according to an intersection angle set by performing the above fastening process. Moreover, since each of two ends between adjacent sides of the pyramid part is connected together by a curve being outwardly convexed from the axis of the fixing shaft in the cross-sectional view perpendicular to the axis of the fixing shaft, and the inner surface of the fixing hole corresponds to the pyramid part, and is formed so that the whole outer surface of the pyramid part can be brought into close contact with the inner surface of the fixing hole, the outer surface of the pyramid part and the inner surface of the fixing hole are entirely brought into close contact with each other. Accordingly, even when the fixing shaft is pulled into the fixing hole in the fastening process, the contact state of both the surfaces becomes wholly constant and uniform at all times. As a result, even if both the surfaces are worn out in the course of the pull-in operation of the fixing shaft, the surfaces are uniformly worn out as a whole, and localized wear can be avoided. Thus, it is possible to suppress deterioration of positioning precision or an increase in maintenance costs resulting from localized wear. Moreover, in the above fastening process, the fixing shaft is pulled into the fixing hole, and the outer surface of the pyramid part and the inner surface of the fixing hole are brought into close contact with each other without any gap in a state where the whole surfaces receives high surface pressures, respectively, and additionally, the fixing shaft is provided integrally with the fixing part. Thus, the object is firmly fastened to the fastener with high rigidity via the retainer. As a result, for example, when the object is a workpiece, the generation of vibration can be suppressed to perform heavy cutting or heavy grinding of the workpiece. Accordingly, for example, as shown in FIG. 10A, a configuration in which a gap 84 is formed when a fixing shaft 82 is fitted into a fixing hole of a main body 83 of a fixing shaft 82 in which rounding is made at corners in a cross-sectional view, and as shown in FIG. 10B, a configuration in which a gap 94 is formed when a fixing shaft 92 is fitted into a fixing hole of a main body 93 in which relief is made at corners, i.e., a configuration in which the fixing shaft and the fixing hole are not brought into close contact with each other over the whole surfaces thereof, are out of the scope of the invention.

In the above fastening process, in order to enhance the follow-up performance of elastic deformation of the pyramid part to the fixing hole, and improve positioning precision around the Z-axis and in the X-axis direction and the Y-axis direction, it is preferable that the pyramid part has an elastic wall portion at the outer edge thereof, in cross-sectional view perpendicular to the axis of the fixing shaft, and predetermined elastic deformation performance is given to the pyramid part by the stress acting on the pyramid part in the fastening process. By adopting such a configuration, the pyramid part can be deformed even if an excessive pulling force is not made to act in the fastening process, and a compact positioning apparatus with excellent operability capable of fastening the object by human power without utilizing mechanical power can be embodied. Moreover, even when a thin-walled portion is formed at the elastic wall portion in cross-sectional view perpendicular to the axis of the fixing shaft, the same functions can be expected. Furthermore, if the elastic wall portion is formed symmetrically with respect to the center of the pyramid part in cross-sectional view perpendicular to the axis of the fixing shaft, since the elastic deformation of the pyramid part becomes uniform, this is desirable.

Moreover, it is preferable that a thick-walled portion which is thicker than the elastic wall portion is formed at a base end of the pyramid part in cross-sectional view along the axis of the fixing shaft. According to this preferable configuration, while the follow-up performance of deformation of the pyramid part to the fixing hole and the operability of the fastening process can be enhanced by the elastic wall portion as described above, predetermined rigidity can be secured by the thick-walled portion provided at the base end of the pyramid part.

The positioning apparatus, the retainer thereof, and the fastener thereof, according to the aspects of the present invention are configured as described above. Thus, the positioning apparatus, the retainer and the fastener can solve various problems. And it is possible to provide a positioning apparatus, a retainer thereof, and a fastener thereof capable of positioning the object rapidly with high precision, in particular, even when attachment and detachment are repeatedly performed to perform positioning in the X-axis to Z-axis directions while performing angular indexing.

BRIEF DESCRIPTION OF THE DRAWINGS

In the accompanying drawings:

FIG. 5A is a cross sectional view illustrating the fastener shown in FIG. 1, taking along a Y-axis of FIG. 4A;

FIG. 5B is a enlarged reference view illustrating a pyramid part of the retainer and a fixing hole of the fastener;

FIG. 6A is a front view illustrating a first fastening part shown in FIG. 1;

FIG. 6B is a top plan view illustrating a second fastening part shown in FIG. 1;

DETAILED DESCRIPTION OF THE EMBODIMENTS

The invention will be described on the basis of its embodiment referring to the accompanying drawings. A positioning apparatus according to the embodiment is used to positionally fix an object in, for example, a lathe, a milling machine, a grinding machine, an electric discharge machine, and a laser beam machine, which are machine tools, and a three-dimensional measuring instrument, and a surface roughness measuring instrument, which are measuring devices, or the other known industrial instruments. However, in the following description, concrete industrial instruments are not illustrated, but the positioning apparatus will be described. Moreover, the invention is not limited to the positioning apparatus according to an embodiment described below, a retainer and a fastener which constitutes the positioning apparatus can be individually embodied, and suitable modifications can be made to the retainer and fastener within the scope of the invention.

Figure 1:
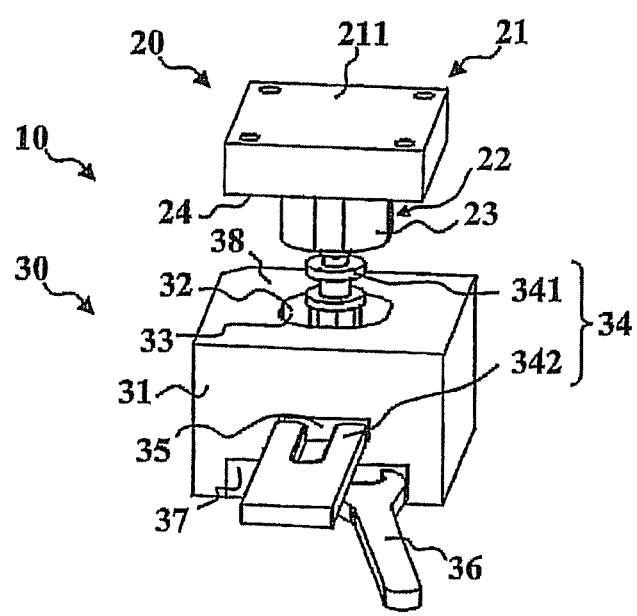
FIG. 1 is a perspective view illustrating a positioning apparatus according to an embodiment of the present invention.

The positioning apparatus 10 shown in FIG. 1 according to the embodiment of the present invention includes a retainer 20 which retains an object and a fastener 30 to which the retainer 20 is detachably fastened. Both the retainer 20 and the fastener 30 are made of a material capable of having comparatively increased hardness through heat treatment and having high toughness, such as stainless steel and tool steel, etc.

(Retainer)

First, the retainer 20 which is a first component of the positioning apparatus 10 will be described with reference to FIGS. 1 to 3B. The retainer 20, as shown in FIGS. 1 and 2A to 2C, has a fixing part 21, a fixing shaft 22 including a pyramid part 23, and a first reference surface 24. Hereinafter, respective components of the retainer 20 will be described.

(Fixing Part)

The rectangular flat plate-like fixing part 21 has one surface (hereinafter referred to as a "fixing surface") 211 which fixes an object. Four through holes 212 which pass through the fixing part 21 in its thickness direction are formed at four corners of the fixing surface 211, and four through screw holes 213 are formed at the central portion of the fixing surface. The through holes 212 and the through screw holes 213 are utilized when fixing the object to the fixing surface 211.

It is preferable to provide a reference surface in the fixing part 21 for fixing the object in the fixing part 21. This reference surface can be preferably provided by fastening a completed retainer 20 to the fastener 30, and forming a reference surface, corresponding to both axes, on the fixing surface 211 or side surface of the retainer 20 along an X-axis and a Y-axis which are determined by the fitting between the retainer 20 and the fastener 30 which will be described later in detail, and by machining the fixing surface 211 into a plane by surface grinding, etc., and forming a reference surface in a Z-axis direction.

(Fixing Shaft)

The fixing shaft 22 which is positioned in an X-axis direction and a Y-axis direction by the fitting with the fixing hole 33 of the fastener 30 has an axis 237 which constitutes the Z-axis, protrudes downward from a bottom surface (the other surface) which is opposite to the fixing surface 211 of the fixing part 21. The fixing shaft 22 is formed integrally with the fixing part 21 without a connecting portion. The fixing shaft 22 has a pyramid part 23 which decreases in size at a constant taper angle θ1 toward its free end, and the axis of the pyramid part 23 is formed so as to become the same axis as the axis 237 of the fixing part 22. In the fixing shaft 22, other elements, for example, a second pyramid part which has a larger taper angle than the pyramid part 23 may be provided at the tip of the pyramid part 23 in order to facilitate the guiding of the fixing shaft 22 to the fixing hole 33, or a fastening part for pulling the fixing shaft 22 into the fixing hole 33 may provide a retaining part for retaining the fixing shaft 22. However, the fixing shaft 22 of this embodiment is formed as the same body as the pyramid part 23, and the other members are not provided.

Although the taper angle is suitably set depending on all the design conditions, such as the size of the positioning apparatus 10, and the material which constitutes the positioning apparatus, the taper angle is set to be preferably equal to or less than 5°, more preferably equal to or less than 1°, and more preferably equal to or less than 0.5°. Additionally, the outer peripheral surface of the pyramid part 23 is worn out as use proceeds since the outer peripheral surface slides on the inner surface of the fixing hole 33 while receiving a comparatively large surface pressure. Accordingly, from the viewpoint of preventing this wear, it is preferable to perforin grinding on the outer peripheral surface of the pyramid part 23 to obtain a smooth surface, or perform a surface hardening treatment, a carburizing and nitriding treatment, high-hardness film formation treatment such as DLC (Diamond Like Carbon), or the other surface hardening treatments on the outer peripheral surface of the pyramid part 23 to obtain a predetermined hardness.

The configuration of the pyramid part 23 will be described in more detail with reference to FIGS. 3A and 3B. As shown in FIG. 3A which is a cross-sectional view perpendicular to the axis 237 of the pyramid part 23, taking along a line B-B of FIG. 2B, the pyramid part 23 of this embodiment has four sides 231a, 231b, 231c, and 231d in the cross-sectional view, the four sides 231a to 231d are arranged so that all intersection angles θ2 between adjacent sides (for example, 231b and 231c) become 90 degrees, and the pyramid part 23 has a substantially square shape in the cross-sectional view. Each of ends between adjacent sides are not directly joined together, but are smoothly joined together through a curve which is outwardly convexed as seen from the center O, i.e., by each of circular arcs 232a, 232b, 232c, and 232d in this embodiment. The size of the circular arcs 232a to 232d is suitably set in consideration of the ease of machining creation of the pyramid part 23. In addition, reference numeral 235 designates a female thread portion formed at the center of the pyramid part 23, and a male thread portion of the fastening part 34 is screwed into this female thread portion.

The pyramid part 23 is formed with four through holes 233a, 233b, 233c, and 233d in the cross-sectional view thereof. The four through holes 233a to 233d with a circular cross-section are distributed and arranged at angles of 90° so that each center O2 is located on a straight line connecting the center O of the pyramid part 23, and the intersection J between adjacent sides (for example, the sides 231*a* and 231*d*) of the respective sides 231*a* to 231*d*, and so as to be concentrical with the center O, and the through holes 233*a* to 233*d* are arranged symmetrically with respect to the center O of the pyramid part 23. Thus, elastic wall portions 238 which are thin-walled and easily elastically deformed are formed between the through holes 233*a* to 233*d* and the outer peripheral surface of the pyramid part 23 and are arranged symmetrically with respect to the center O at an outer edge portion of the pyramid part 23.

Figure 3A:
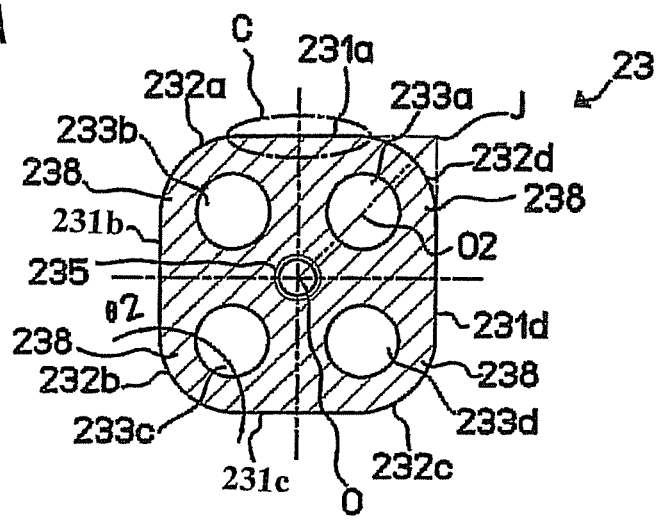
FIG. 3A is a cross sectional view illustrating the retainer shown in FIG. 1, taking along a line B-B of FIG. 2B.
Figure 3B:
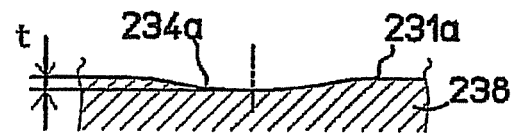
FIG. 3B is a partially enlarged cross sectional view of a portion C of FIG. 3A.

Moreover, as shown in FIG. 3B which is a partially enlarged cross-sectional view in which a portion C of FIG. 3A is enlarged, recesses 234*a* to 234*d* which are smoothly recessed by a depth t with respect to straight portions are formed at the respective sides 231*a* to 231*d* of the pyramid part 23. By the recesses 234*a* to 234*d*, thin-walled portions are formed at the elastic wall portions 238 which are symmetrically arranged. The recesses 234*a* to 234*d* not only constitute the thin-walled portions in this way, but also are advantageous in forming the respective sides 231*a* to 231*d* with a high degree of straightness (flatness in each surface of the pyramid part 23 corresponding to each side), when the length of the respective sides 231*a* to 231*d* is relatively long in the large-sized positioning apparatus.

Figure 2A:
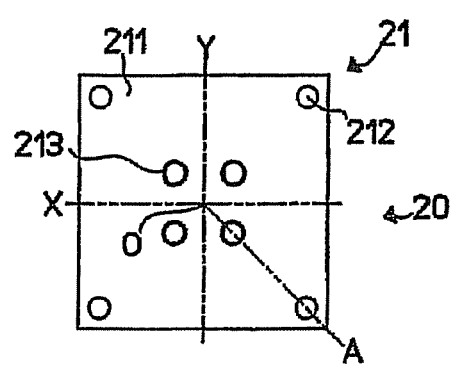
FIG. 2A is a top plane view illustrating a retainer shown in FIG. 1.
Figure 2B:
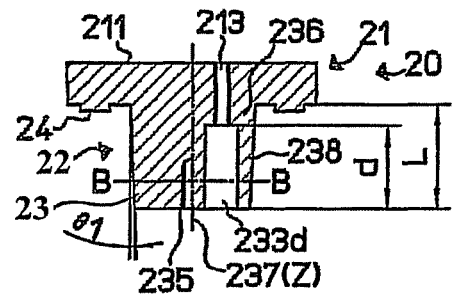
FIG. 2B is a cross sectional view illustrating the retainer shown in FIG. 1, a left half of FIG. 2B is a cross sectional view taking along an X-axis of FIG. 2A and a right half of FIG. 2B is a cross sectional view taking along a line O-A of FIG. 2A.

Additionally, as shown in the right half of FIG. 2B which is a cross-sectional view along the axis of the pyramid part 23, taking along a line O-A of FIG. 2A, the depth of the through holes 233*a* to 233*d* which are opened to the free end face of the pyramid part 23 is a depth d which is smaller than the protruding length L of the pyramid part 23 from the bottom surface of the fixing part 21, and the base end of the pyramid part 23 is formed with thick-walled portions 236 which are thicker than the elastic wall portions 238. The four through screw holes 213 provided in the fixing part 21, as shown in the drawing, are arranged so as to pass through the respective through holes 233*a* to 233*d*.

(First Reference Surface)

Figure 2C:
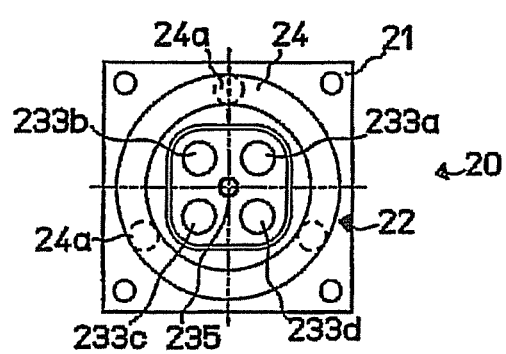
FIG. 2C is a bottom view illustrating the retainer shown in FIG. 1.

As shown in FIGS. 2B and 2C, the first reference surface 24 perpendicular to the axis 237 of the fixing shaft 22 protrudes downward from the bottom surface of the fixing part 21, and is provided as the bottom surface of an annular protruding portion which is concentrically formed with the axis 237. The first reference surface 24 is used to perform positioning of the object, which is held by the retainer 20, in the Z-axis direction by coming into contact with a second reference surface 38 which is the top surface of the fastener 30. Although the first reference surface 24 of this embodiment has been configured as described above for ease of formation, a surface perpendicular to the axis 237 of the fixing shaft 22 may be formed as the first reference surface, alternatively. That is, the bottom surface itself of the fixing part 21 may be used as the first reference surface, or like a first reference surface of a dotted line designated by reference numeral 24*a* in FIG. 2C, the bottom surfaces of three protruding portions which are arranged concentrically with the center O may be used as the first reference surface.

(Fastener)

Next, the fastener 30 which is a second component of the positioning apparatus 10 will be descried with reference to FIGS. 1. and 4A to 6B. The fastener 30, as shown in FIG. 1, includes a main body 31 formed with the fixing hole 33 into which the fixing shaft 22 can be inserted, and a fastening part 34 which pulls the fixing shaft 22 inserted into the fixing hole 33 downward. The fastener 30 is fixed to a predetermined position of a table, etc. of a machine tool by a well-known fixing member (not shown) which is provided in the main body 31. Hereinafter, the configuration of the main body 31 and the fastening part 34 will be described.

(Main Body)

Figure 4A:
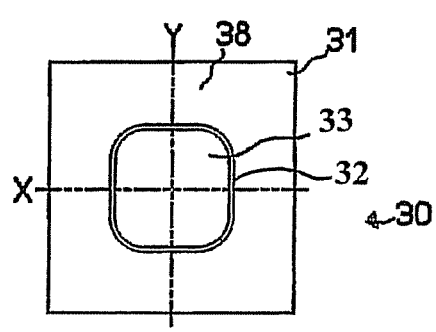
FIG. 4A is a top plane view illustrating a fastener shown in FIG. 1.
Figure 4B:
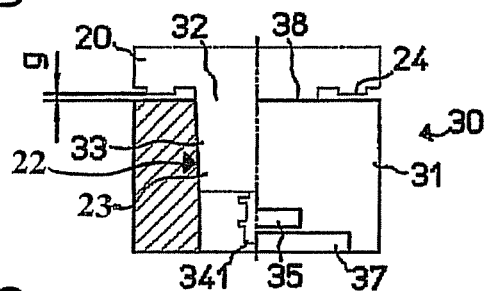
FIG. 4B is a reference view illustrating the fastener shown in FIG. 1, a left half of FIG. 4B is a cross sectional view taking along an X-axis of FIG. 4A and a right half of FIG. 4B is a front view.

As shown in FIGS. 1 and 4A to 4C, a central portion of the rectangular block-shaped main body 31 is formed with the fixing hole 33 which is vertically provided from an opening 32 opened to the top surface 38 (one surface) thereof. The fixing hole 33 corresponds to the pyramid part 23 of the retainer 20, and is formed so that the whole outer peripheral surface of the pyramid part 23 can be brought into close contact therewith. That is, the inner surface of the fixing hole 33 is formed substantially in the shape of a pyramid which is opened upward at the same taper angle θ1 as the pyramid part 23, and the shape of the fixing hole in cross-sectional view perpendicular to the axis thereof, similarly to the pyramid part 23, is a substantially square shape which is constituted by straight lines of four sides, has an intersection angle of 90° between adjacent sides, and further has circular arcs joining adjacent sides. In addition, in order to provide the thin-walled portions, the recesses 234*a* to 234*d* are provided at the outer peripheral surface of the pyramid part 23. However, projections corresponding to the recesses 234*a* to 234*d* may not necessarily be provided in the fixing hole 33. Additionally, the fixing hole 33 passing through the main body 31 is opened to the bottom surface (the other surface) of the main body 31. However, the depth of the fixing hole 33, as shown in FIG. 4B, is a depth such that a first fastening member 341 of the fastening part 34 does not protrude from the bottom surface of the main body 31 when the pyramid part 23 fits into the fixing hole 33 in a state where the first fastening member 341 is connected to the free end of the fixing shaft 22.

The top surface 38 of the main body 31 is constituted as a surface perpendicular to the axis of the fixing hole 33 so as to function as the second reference surface in the embodiment, and performs positioning of the object in the Z-axis direction as the first reference surface 24 of the retainer 20 comes into contact with the second reference surface 38. The form of the second reference surface is not limited thereto, and a surface perpendicular to the axis of the fixing hole 33 may be formed as the second reference surface, alternatively as well as the first reference surface.

Here, as shown in FIG. 4B, when the retainer 20 is combined with the fastener 30 in a state where an operator's operating force, and an external force other than the weight of the retainer 20 including the object do not act at all, and the outer peripheral surface of the pyramid part 23 is fitted to the inner surface of the fixing hole 33, the pyramid part 23 or the fixing hole 33 are formed such that a predetermined gap g, preferably, a gap of 0.3 mm or less is formed between the first reference surface 24 and the second reference surface 38. Specifically, as shown in FIG. 5B, even in a certain cross-section when the first reference surface 24 and the second reference surface 38 are brought into contact with each other, the actual size of the pyramid part 23 is set to be greater than the fixing hole 33 by a dimension f (although the dimension f is shown in an exaggerated manner in FIG. 5B for the purpose of understanding, the actual dimension is 1 mm or less even when the taper angle is 1°).

Although the main body 31 is provided with an insertion hole portion 35 for allowing a second fastening member 342 of the fastening part 34 to be inserted thereinto, and a bottom opening 37 for allowing a tool 36 for rotating the first fastening member 341 to be inserted thereinto, their detailed configuration will be described later in the following fastening part.

(Fastening Part)

The fastening part 34, as shown in FIG. 1, is constituted by the first fastening member 341 and the second fastening member 342. As shown in FIG. 6A, the substantially cylindrical first fastening member 341 is constituted by a male thread portion 343 which is formed at a left end (one end), a rotating portion 344 which is a hexagonal head formed on the same axis as the male thread portion 343 at a right end (the other end), and a pair of flange portions 345 which are spaced apart from each other by a predetermined spacing L1 formed therebetween, and a shaft portion 346 with a diameter $\phi D$ formed between the flange portion 345. The male thread portion 343 is formed so as to be engageable with the female thread portion 235 (refer to FIGS. 2B and 2C) which is formed at a free end face of the fixing shaft 22, and the length thereof is shorter than the depth of the female screw portion 235. The first fastening member 341, as shown in FIG. 4B, and FIG. 5A which is a right side cross-sectional view of FIG. 4B, is inserted into the fixing hole 33 along with the retainer 20 in a state where the male thread portion 343 is screwed into the female thread portion 235, and the flange portions 345 and the rotating portion 344 are configured so as to be positioned at predetermined stop positions in the axis direction in a state where the pyramid part 23 and the fixing hole 33 fit to each other.

As shown in FIGS. 4B and 5A, insertion hole portions 35 are provided at positions corresponding to the stop positions of the flange portions 345 in the main body 31. The insertion hole portions 35 have an opening height which is slightly greater than the spacing L1 between the flange portions 345, and are formed in a state where the insertion hole portions 35 pass through the main body 31 so as to be opened to the front surface and rear surface of the main body 31.

Figure 4C:
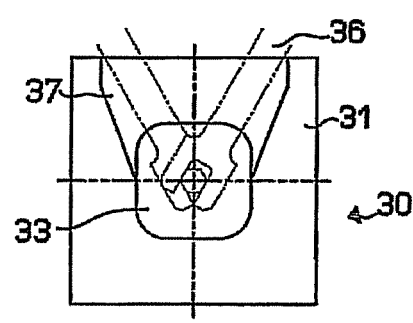
FIG. 4C is a bottom view illustrating the fastener shown in FIG. 1.

Moreover, a bottom opening 37 is formed in the main body 31 so as to include the fixing hole 33 at a position corresponding to the stop position of the rotating portion 344, i.e., at the bottom of the main body 31. The bottom opening 37 has an opening height which is greater than the thickness of the tool 36 (refer to FIG. 5A) which is to be inserted into the bottom opening, and the size of the bottom opening in plan view is a size such that the tool 36 inserted as shown in FIG. 4C can be turned and operated.

The second fastening member 342 will be described. The second fastening member 342 which constitutes the fastening part 34 in cooperation with the first fastening member 341, as shown in FIG. 6B, is a plate-like body having a thickness which is slightly smaller than the width L1 between the flange portions 345 of the first fastening member 341 so that the second fastening member 342 can be loosely fitted into a gap between the flange portions 345. Additionally, the second fastening member 342 is formed so that the width L2 thereof is slightly smaller than the width of the insertion hole portion 35 provided in the main body 31. Moreover, a groove-like cutout 348 which is provided with a width L3 which is slightly greater than the diameter $\phi D$ of the shaft portion 346 of the first fastening member 341 is provided at a right end of the second fastening member 342, and the length of the cutout 348, as shown in FIG. 5A, is a length such that the flange portions of the first fastening member 341 located at the stop positions can be included.

Figure 7A:
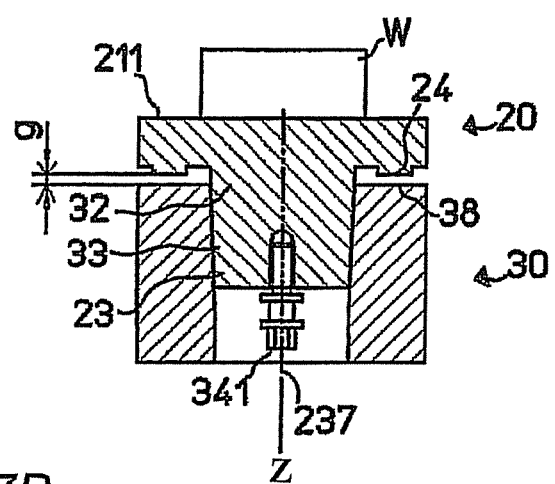
FIG. 7A is a cross sectional view illustrating the positioning apparatus in a state where a first reference surface of the retainer is separated from a second reference surface of the fastener.

A method of using the positioning apparatus 10 constituted by the retainer 20 and the fastener 30 will be described with reference to FIGS. 1, 7A and 7B. As shown in FIGS. 1 and 7A, an operator fixes an object W to be fastened to the fixing surface 211 of the fixing part 21 in a predetermined posture, and screws the first fastening member 341 to the fixing shaft 22. Next, the operator aligns the pyramid part 23 with the fixing hole 33 in a horizontal plane so that the object W has a predetermined posture around the axis (Z-axis) 237, and then inserts the fixing shaft 22 into the fixing hole 33. Then, the outer peripheral surface of the pyramid part 23 is fitted to the inner surface of the fixing hole 33, and the object W is brought into a positioned state of being positioned around the Z-axis and in the X-axis direction and the Y-axis direction. However, the gap g is formed between the first reference surface 24 and the second reference surface 38, and the object W is still not positioned in the Z-axis direction.

Figure 7B:
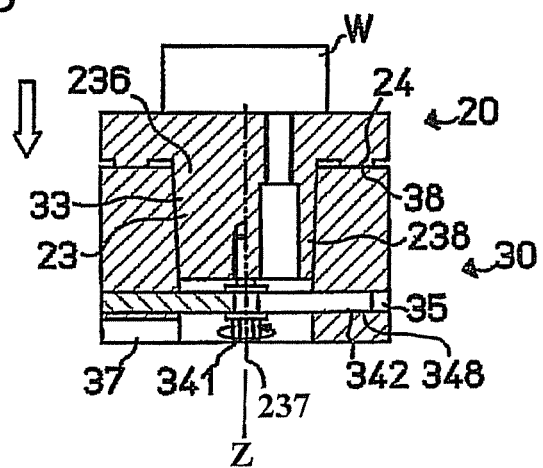
FIG. 7B is a cross sectional view illustrating the positioning apparatus in a state where the first reference surface of the retainer comes into contact with the second reference surface of the fastener.

Next, as shown in FIG. 7B, the operator fits the second fastening member 342 into the gap between the flange portions 345 of the first fastening member 341 (refer to FIG. 6A) which are located at the stop positions by the fitting between the pyramid part 23 and the fixing hole 33 which are in the positioned state, through the insertion hole portion 35 provided in the main body 31. Then, the operator rotates the rotating portion 344 in the direction of an arrow shown in the drawing using the tool 36 (for example, a spanner; refer to FIG. 1) capable of rotating the rotating portion 344 of the first fastening member 341. Since the movement of the first fastening member 341 in the axis direction is regulated by the second fastening member 342 fitted into the flange portions 345, thrust begins to act on the female thread portion 235 downward via the male thread portion 343 to be screwed. Then, the retainer 20 formed with the female thread portion 235 is pulled downward by a predetermined pull force, and the surface pressure determined by the taper angle $\theta 1$ acts on both the surfaces of the outer peripheral surface of the pyramid part 23 and the inner surface of the fixing hole 33, and thereby the pyramid part 23 and the fixing hole 33 elastically deform. Here, since the pyramid part 23 of this embodiment is provided with the elastic wall portions 238, the pyramid part 23 in a positioned state is further pulled downward into the fixing hole 33 while the pyramid part 23 mainly deforms due to the elastic deformation of the elastic wall portions 238 in the X-axis direction and Y-axis direction. Through this fastening process, the first reference surface 24 and the second reference surface 38 come into contact with each other, thereby completing positioning in the Z-axis direction.

Figure 8A:
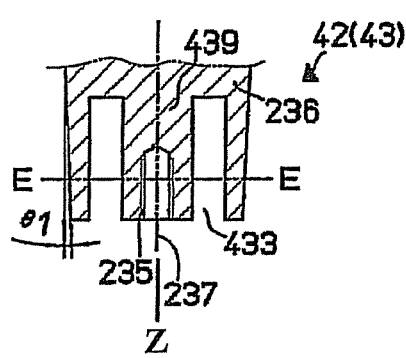
FIG. 8A is a partial cross sectional view illustrating a pyramid part of a retainer according to another embodiment of the present invention.
Figure 8B:
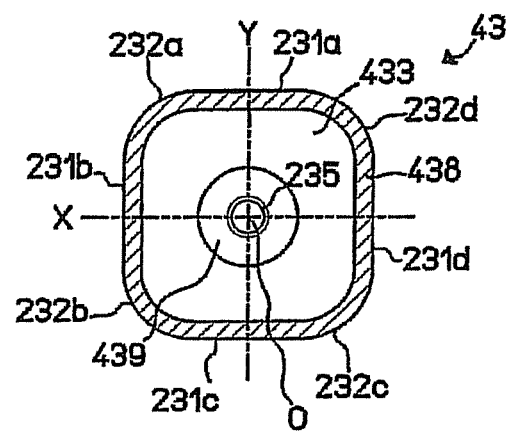
FIG. 8B is a cross sectional view taking along a line E-E of FIG. 8A.

After all positioning around the X-axis, Y-axis, and Z-axis has been completed by the fastening process after the above positioning, the object W undergoes processing, such as machining or testing. After this processing is completed, the operator rotates the rotating portion 344 of the first fastening member 341 in a direction opposite to the fastening process, and separates the retainer 20 from the fastener 30. Subsequently, the operator aligns the pyramid part 23 with the fixing hole 33 in the horizontal plane so that the member W to be fastened has the next posture around the axis (Z-axis) 237 (for example, the posture in which the previous posture has been turned by 90°), and inserts the fixing shaft 22 into the fixing hole 33. Hereinafter, operations will be performed similarly to the above. In addition, in the pyramid part 23 of the embodiment described above, the four through holes 233a to 233d are arranged as described above. However, the pyramid part can be configured like a pyramid part 43 shown in FIGS. 8A and 8B which is a modification. As shown in FIG. 8B which is a cross-sectional view perpendicular to the axis 237 of the pyramid part 43, taking along a line E-E of FIG. 8A, a cylindrical boss portion 439 for forming the female thread portion 235 is left at the center of the pyramid part 43, a substantially frame-like bottomed wall 433 of which the outer peripheral surface runs along the outer peripheral shape of the pyramid part 43 is formed on the same axis as the boss portion 439, and the outer wall of a bottomed wall 433 having a constant thickness constitutes an elastic wall portion 438.

By making the elastic wall portion 438 constant in this way, in the above fastening process, the elastic wall portion 438 elastically deforms uniformly. Thus, positioning around the Z-axis and in the X-axis direction and the Y-axis direction can be performed with high precision. In addition, the elastic wall portion 438 in such a state has advantages that the retainer is made lightweight, and operability can be improved, particularly when the positioning apparatus is enlarged for fastening a large-sized object.

Figure 9:
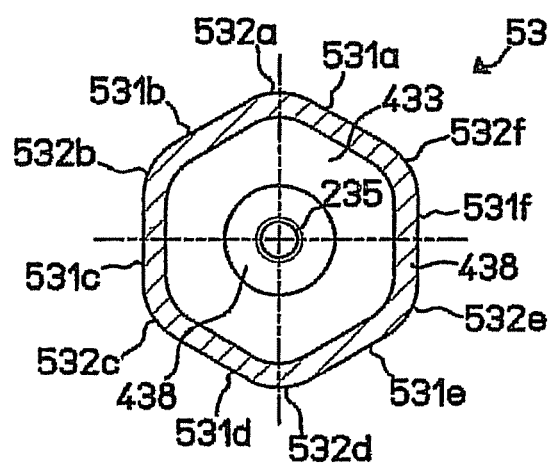
FIG. 9 is a bottom view illustrating a pyramid part of a retainer according to still another embodiment of the present invention.
Figure 10A:
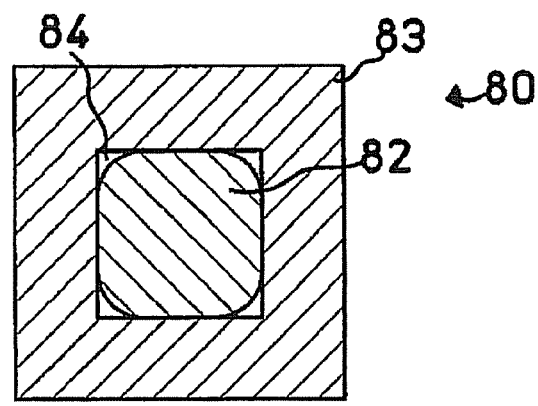
FIG. 10A is a reference view illustrating one positioning apparatus excluded from the present invention.
Figure 10B:
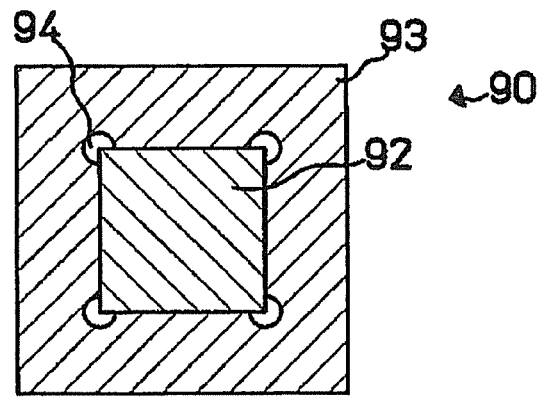
FIG. 10B is a reference view illustrating another positioning apparatus excluded from the present invention.

Moreover, in the positioning apparatus of this embodiment, the shape of the fixing shaft and fixing hole in the cross-sectional view perpendicular to an axis is a substantially square shape as described above. However, this shape may be a proper regular polygonal shape according to a desired indexing angle of the object around the Z-axis. That is, when the indexing angle of an object is set to 60°, like a pyramid part 53 shown in FIG. 9, the pyramid part may have six sides 531a to 531f in the cross-sectional view perpendicular to an axis, the six sides 531a to 531f may be arranged so that all intersection angles between adjacent sides become 120°, the ends of the six sides 531a to 531f may be connected by circular arcs 532a to 532f, thereby forming the pyramid part 53 into a substantially regular hexagonal shape. The fixing hole may be formed so as to have an inner surface which corresponds to the pyramid part 53 and is formed so as to be capable of being brought into close contact with the whole outer peripheral surface of the pyramid part.

What is claimed is:

1. A positioning apparatus for positioning an object in respective axis directions of an X-axis, a Y-axis perpendicular to the X-axis, and a Z-axis orthogonal to the X-axis and the Y-axis and positioning the object around the Z-axis within a plane parallel to the X-axis and the Y-axis, the positioning apparatus comprising:
    a retainer; and
    a fastener being configured to detachably fasten the retainer,
    wherein the retainer includes:
        a fixing part having a first retainer surface and a second retainer surface opposite to the first retainer surface and being configured to fix the object on the first retainer surface thereof;
        a fixing shaft having an axis which extends in the Z-axis direction and positions the object in the X-axis direction and the Y-axis direction and protruding from the second retainer surface of the fixing part; and
        a first reference surface being disposed at a side of the second retainer surface of the fixing part and being arranged perpendicular to the axis of the fixing shaft,
    wherein the fixing shaft is formed integrally with the fixing part and has a tapered pyramid part which decreases in size at a constant angle toward a free end thereof and which is formed coaxially with the fixing shaft,
    wherein each of intersection angles between adjacent sides of the pyramid part is the same and each of two ends between the adjacent sides is connected by a curve being outwardly convexed from the axis of the fixing shaft in a cross-sectional view perpendicular to the axis of the fixing shaft,
    wherein the fastener includes:
        a body part having a first fastener surface and a second fastener surface opposite to the first fastener surface,
        a fixing hole being formed in the first fastener surface of the body part and having an inner surface which corresponds to the pyramid part of the fixing shaft so that a whole outer surface of the pyramid part can come into close contact with the inner surface of fixing hole,
        a second reference surface being disposed at a side of the first fastener surface of the body part and being arranged perpendicular to an axis of the fixing hole so that the first reference surface can come into contact with the second reference surface, and
        a fastening part being configured to pull the fixing shaft which is inserted into the fixing hole toward the second fastener surface of the body part;
    wherein the fixing shaft or the fixing hole is configured such that a gap is formed between the first reference surface and the second reference surface when the fixing shaft is inserted into the fixing hole, the outer surface of the pyramid part fits to the inner surface of the fixing hole and the object is positioned in the X-axis direction and the Y-axis direction, and is configured such that the first reference surface and the second reference surface come into contact with each other when the fastening part pulls the fixing shaft toward the second fastener surface of the body part, the pyramid part or the fixing hole elastically deforms, and the fixing shaft is further pulled into the fixing hole with maintaining the fitting between the outer surface of the pyramid part and the inner surface of the fixing hole,
    wherein the pyramid part is formed with a hole in the cross-sectional view perpendicular to the axis of the fixing shaft, to form a plurality of elastic wall portions on respective sides of the pyramid part between the outer surface of the pyramid part and the through hole, and
    wherein the respective sides of the pyramid part are formed at center portions thereof with recesses which are smoothly recessed by a predetermined depth with respect to straight portions formed at both sides of the center portions of the respective sides in the cross-sectional view perpendicular to the axis of the fixing shaft, to form a plurality of thin-walled portions at the respective elastic wall portions;
    wherein the fastening part comprises:
        a first fastening member including:
            a male thread portion at one end, the male thread portion being configured to be screwed into a female thread portion which is arranged along the axis of the fixing shaft and provided in the fixing shaft,
            a rotating portion at the other end, the rotating portion being configured to rotate the male thread portion, and
            a pair of flange portions being spaced apart from each other with a predetermined gap and being disposed between the male thread portion and the rotating portion, wherein the first fastening member is capable of being inserted through the fixing hole of the fastener in a state where the male thread portion is screwed into the female thread portion and the first fastening member is fixed to the fixing shaft, and
        a second fastening member being configured to be inserted through an insertion hole portion formed on one surface of the fastener and fitted into the predetermined gap between the flange portions in a state where the fixing shaft is inserted into the fixing hole and the retainer is positioned in the X-axis direction and the Y-axis direction.

2. The positioning apparatus as set forth in claim 1, wherein the insertion hole portion is formed only in a direction corresponding to one side of the fixing hole in the cross-sectional view perpendicular to the axis of the fixing shaft.

* * * * *